Jan. 28, 1969   W. G. BURROW ET AL   3,424,050
HYDRAULIC CLAMP
Filed Oct. 2, 1967
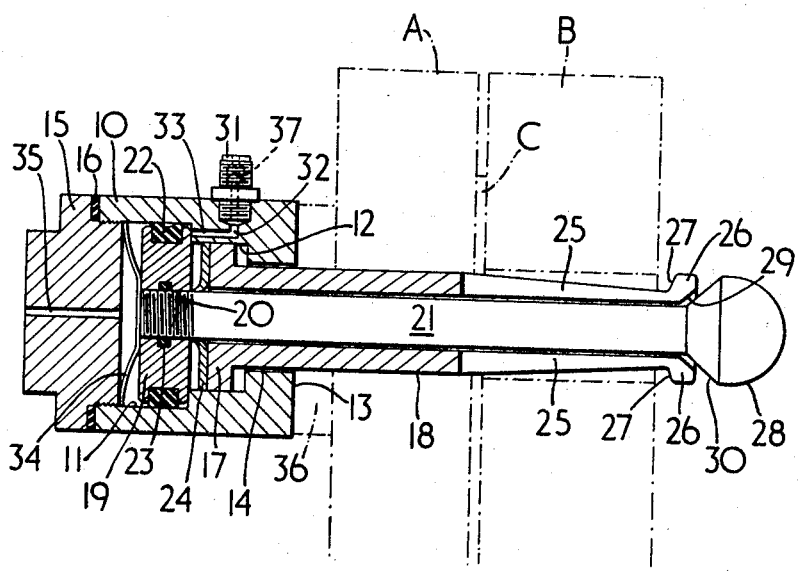
INVENTORS:-
WILLIAM GORDON BURROW &
O LEWIS SMITH (JUNIOR)
BY:-
ATTORNEY United States Patent Office 3,424,050
Patented Jan. 28, 1969

3,424,050
HYDRAULIC CLAMP
William G. Burrow, T.A.P., % Arabian Oil Co., Ras-Al-Khafji, Neutral Zone, Kuwait, and O Lewis Smith, Jr., 3616 Regent Drive, Dallas, Tex. 75229
Filed Oct. 2, 1967, Ser. No. 672,142
Claims priority, application Great Britain, Dec. 29, 1966, 58,102/66
U.S. Cl. 85—77
Int. Cl. F16b 2/24
5 Claims

ABSTRACT OF THE DISCLOSURE

Adjacent sides of two flat members are held abutted by clamping means having a hollow stem extending from a clamping face and through aligned bores in the members. The free end of the stem is formed with collet fingers having abutment faces, and the collet actuator extends through the stem. The stem and actuator are connected to pistons of different diameters so that when a working fluid is fed between them they will first expand the collet and then clamp the members together.

---

The invention relates to clamping means for urging parallel faces of at least two members into abutting relationship, and has for its object to enable such members to be clamped quickly and effectively together.

According to the invention the clamping means includes a cylinder having its bore formed in two axial portions of different diameters with the smaller diameter bore portion adjacent an opening of still smaller diameter in one end wall through which opening extend two coaxial piston rods respectively fast with axially-spaced pistons coacting with the respective bore portions, the piston rod of the smaller diameter piston being hollow and formed at an outer end portion with convergent collet fingers having radial abutments on their radially-outer sides at their extremities, and the piston rod of the larger diameter piston extending through the hollow piston rod and formed at an outer end portion with convergent collet fingers whereby, with the hollow piston rod extending through aligned bores in the said members, the application of fluid pressure within the cylinder to urge the two pistons apart will first cause the said head to force the collet fingers into engagement with the member bore at that end and then, due to their differential areas, will urge both of them simultaneously, against a bias, to cause the collet finger abutments to clamp the members, in the desired abutting relationship, against the outer surface of the said end wall.

The fluid pressure can be applied in any suitable fashion, for example by an explosive charge or from a cylinder containing compressed gas. Alternatively, it could be supplied from a pump, particularly in the case where the fluid medium is a liquid.

According to a feature of the invention the cylinder is provided with means for connection to a source of fluid pressure, the connection communicating with an inlet port leading to the interior of the cylinder in a position intermediate the pistons. In such a case the connecting means can incorporate a non-return valve.

According to another feature the pistons are maintained axially-spaced by the conjoint action of the larger piston abutting the step between the two bore portions of the cylinder and the engagement of the said head with the outer ends of the collet fingers when the latter are in their convergent position.

According to a still further feature the radially-inner side of the collet fingers at their outer ends are formed as ramps, and the surface of the head at the side adjacent its associated piston is made to converge towards the latter whereby to facilitate the action of the head in expanding the collet fingers.

The invention is particularly adapted for clamping together in sealing relationship the flanges of pipe lengths or lengths of hose, and there is the additional advantage that the operation of clamping the members together does not produce any torsional forces between them.

In the accompanying drawing is shown in longitudinal section one embodiment of the present invention as applied to the clamping of a radial flange A of an oil supply line to a flange B of the inlet pipe to an oil tanker vessel.

Referring to the drawing, the pressure fluid cylinder is indicated at 10, having a larger diameter bore portion 11 and a smaller diameter bore portion 12. The cylinder is shown as having an integral end wall providing an axially-outer end surface 13, which is normal to its axis, with a coaxial opening 14 which is of less diameter than bore portion 12. The opposite end of the cylinder is provided with a screw-threaded closure cap 15 seating on a sealing ring 16.

Within bore portion 12 is a coacting piston 17 having a hollow piston rod 18 extending with working clearance through opening 14, and within the larger diameter bore portion 11 is a coacting piston 19 which is made fast, as by a screw thread 20, with a piston rod 21 which extends coaxially through the hollow interior of piston rod 18 with working clearance between them.

Piston 19 is provided with a peripheral seal 22 against bore portion 11 and with a sealing ring 23 in its screw-threaded connection to rod 21, and piston 17 is provided at the end adjacent piston 19 with an annular, lipped washer 24 which effects a seal between bore portion 12 and rod 21.

The outer end of piston rod 18 is axially slit to provide convergent collet fingers 25 provided at their extremities with abutments 26 on their radially-outer faces. These abutments have faces 27 which face piston 17 and which, when the collet fingers are urged outwardly as hereinafter explained, will lie in a plane radial to the axis of piston rod 18.

Piston rod 21 is provided with a head 28 which normally extends beyond the ends of collet fingers 25. The latter are provided with ramps 29 confronted by a convergent surface 30 of the head 28 so that when the head is drawn into the space between the collet fingers as hereinafter described the said fingers are hinged outwardly about their roots.

Cylinder 10 is provided with a union 31 for connection to a supply of fluid pressure, and the union communicates through ducts 32 and 33 with the interior of the cylinder in a position intermediate pistons 17 and 19. As shown, duct 33 emerges through the step between cylinder bore portions 11 and 12. The pistons are spaced apart normally by piston 19 being biassed by a spring 34 into engagement with the said step between cylinder bore portions 11 and 12, and by the engagement of head 28 with the extremities of collet fingers 25.

When pressure fluid is admitted to the cylinder the pistons are urged apart, piston 19 moving against the bias of spring 34 and expressing fluid in advance of its movement through a vent 35 in closure cap 15. This, when occurring with piston rod 18 and collet fingers 25 within aligned bores in the members A and B which are to be clamped together, results in head 28 being drawn inwardly of the collet fingers and causing the latter to be expanded into engagement with the bore in member B. After the force exerted by the fluid pressure on piston 19 overcomes the pressure it exerts on piston 17 plus the reaction of spring 34, the two pistons are moved towards the left of the figure owing to the exposed area of piston 19 being greater than the exposed area of piston 17. This results in the radial faces 27 engaging the adjacent surface of member B and urging member A into firm engagement with end wall surface 13 so as to hold the adjacent surfaces of members A and B in sealing relationship.

If desired, or expedient, a sealing washer C may be inserted between members A and B, and if the aggregate width of the two members, and of the intervening sealing washer, if used, is less than the minimum spacing of surfaces 13 and 27, use may be made of a distance piece 36 as indicated in the figure.

In the case where the fluid pressure is provided from a constant source through a cut off valve, spring 34 will return the pistons automatically to their initial positions when the incoming pressure is released, but, instead, the union 31 may incorporate a non-return valve 37 which will permit the fluid pressure source to be disconnected and yet maintain the clamping pressure until the non-return valve is operated to release the fluid pressure within the cylinder.

It will be appreciated that the invention is applicable to other uses than those specifically mentioned above, for example for holding two plates together in accurate abutting relationship while they are being drilled with additional aligned bores to receive normal bolts to be secured in position with nuts.

What we claim as our invention and desire to secure by Letters Patent of the United States is:

1. Clamping means for urging parallel faces of at least two members into abutting relationship, comprising a cylinder body provided with two contiguous coaxial bores of different diameters defining an annular step between them, said body having an end wall defining the outer end of the smaller diameter bore, said end wall having an opening coaxial with the smaller diameter bore and of less diameter than the latter, said end wall having an outer face normal to the axis of said bores, respective pistons in said bores to coact with them, the piston of smaller diameter provided with a hollow piston rod sealingly extending through said opening to the outside of said body, the piston of larger diameter provided with a piston rod which extends through said hollow piston rod to the outside of said body, an outer end portion of said hollow piston rod axially slit to form convergent collet fingers, respective radially outwardly extending abutments at the free ends of said collet fingers, and a head at the extending end of said piston rod of said larger diameter piston for coaction with the free ends of said collet fingers whereby, with the hollow piston rod extending through aligned holes in the members which are to be held abutted, the application of fluid pressure between said pistons will urge them apart to cause said head to expand said collet fingers into engagement with the hole in the adjacent said member, and then, due to the differential areas of said pistons, will urge said pistons unidirectionally to cause said abutments to clamp both said members, in abutting relationship, against the outer surface of said end wall.

2. Clamping means, according to claim 1, in which the cylinder body is provided with means for connection to a source of fluid pressure, said connection communicating with an inlet port leading to a position intermediate the pistons.

3. Clamping means, according to claim 2, in which the connecting means incorporates a non-return valve.

4. Clamping means, according to claim 1, in which the pistons are normally maintained axially spaced by the conjoint action of the larger diameter piston being urged by biasing means against the annular step, and of the engagement of the head with the outer ends of the collet fingers when the latter are in their convergent position.

5. Clamping means, according to claim 1, in which the radially-inner side of the collet fingers at their outer ends are formed as ramps, and the surface of the head at the side adjacent its associated piston is made to converge towards the latter whereby to facilitate the action of the head in expanding the collet fingers.

References Cited

UNITED STATES PATENTS

| | | | |
|---|---|---|---|
| 3,158,059 | 11/1964 | Myers | 85—77 |
| 3,254,555 | 6/1966 | Joneikis | 88—77 |
| 3,266,364 | 8/1966 | Becker | 85—81 |

BERNARD A. GELAK, *Primary Examiner.*

U.S. Cl. X.R.

24—211; 85—81